April 15, 1941.　　　O. G. ALMCRANTZ　　　2,238,095
TRAILER HITCH
Filed March 24, 1939　　　2 Sheets-Sheet 1

INVENTOR.
Oscar G. Almcrantz,
By Parkinson & Lane
ATTORNEYS.

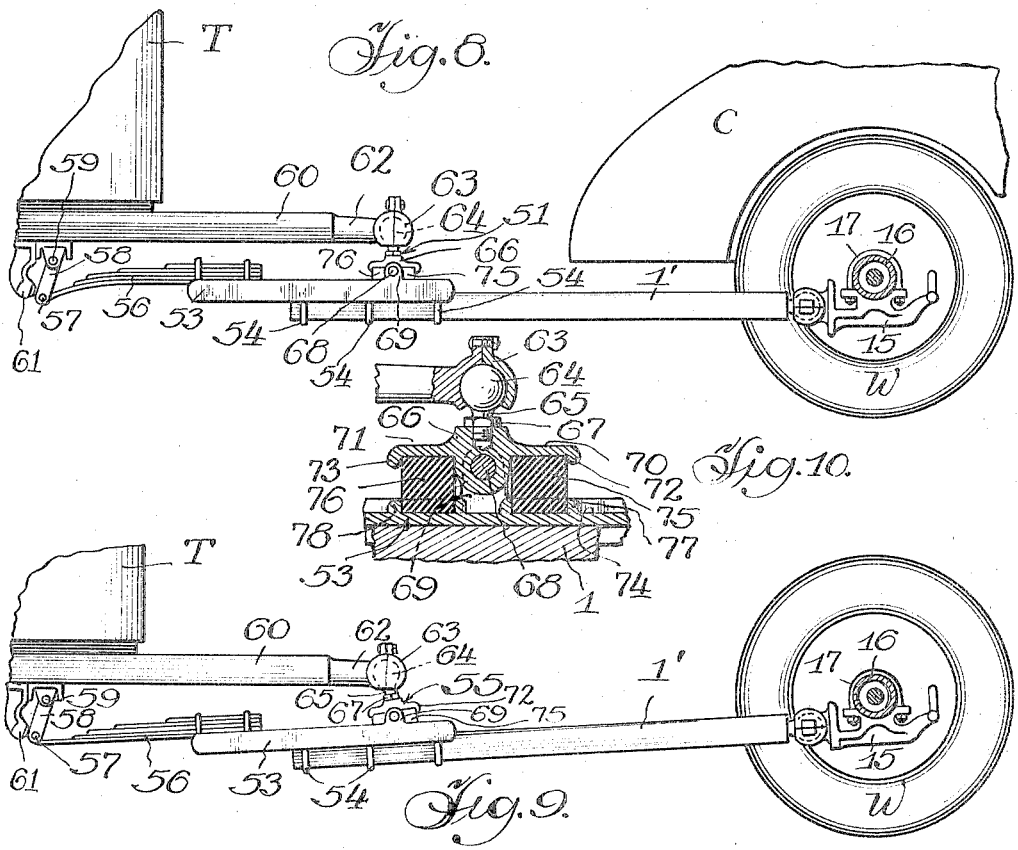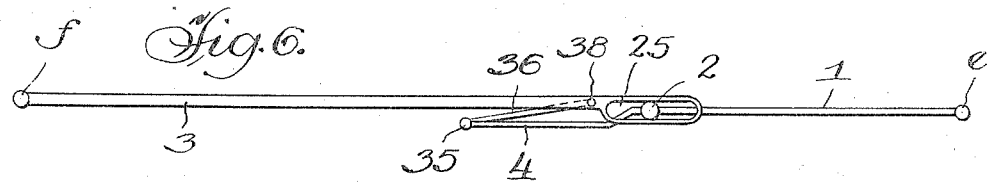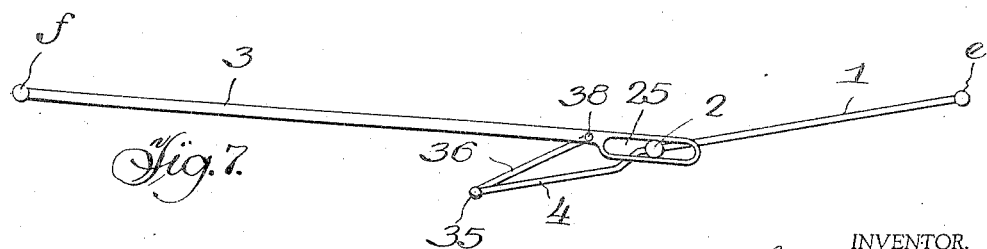

Patented Apr. 15, 1941

2,238,095

UNITED STATES PATENT OFFICE 2,238,095

TRAILER HITCH

Oscar G. Almcrantz, Evanston, Ill.

Application March 24, 1939, Serial No. 263,953

18 Claims. (Cl. 280—33.9)

This invention relates to a trailer hitch for hitching a trailer to an automobile or other towing car in such manner as to eliminate surge and to greatly improve the riding comfort in both the towing automobile and the trailer.

In trailer hitches prior to my invention considerable discomfort has been experienced by the people riding in the tow car or the trailer, especially those riding in the towing car, due to the surge or sudden longitudinal push or pull caused by a frequent change in the distance between the tow car and the trailer due to one or both of the rear wheels of the tow car dropping into a depression or passing over a hump in the road. This has, in the prior known trailer hitches, been due to a relative flexing or jack-knifing of the drawbar and trailer shaft with a corresponding shortening of their overall length, thus creating a rearward pull or rearward surge on the tow car during the first half of this jack-knifing action, and a push or forward surge when the drawbar and trailer shaft were straightening out again or recovering from said jack-knifing action.

These surging actions will be better understood by considering the overall shortening effect taking place between the two outer ends of two alined straight bars hinged together at their adjoining ends when the hinged ends are forced downwardly into angular positions with relation to each other and to the horizontal. Also when the hinged ends are again returned to their original position with the two bars again in alinement the overall length will have lengthened by an amount equal to that by which it was shortened by the flexing or jack-knifing action. Another example illustrative of this shortening and lengthening action is to consider a flexible but non-extensible wire held straight horizontally but with one end fixed and the other end movable horizontally only. When the middle or some other intermediate point of said wire is moved downwardly (or upwardly) the horizontally slidable end of said wire will move toward the fixed end during the downward (or upward) movement of said middle or intermediate point, resulting in a shortening of the horizontal overall distance between the two ends of the wire. If a spring be secured to the movable end of the wire so as to normally tend to move the same horizontally away from the fixed end of the wire the overall horizontal distance between the two ends of the wire will be increased again, when the said middle or intermediate point is brought back to its original starting position, by an amount equal to said shortening.

The same lengthening and shortening action occurs between a trailer and its tow car when one or both of the rear wheels of the tow car drops into a depression or passes over a hump in the roadway, due to the jack-knifing or flexing of the drawbar and the trailer shaft connecting the car and trailer. From the foregoing it is obvious that this jack-knifing or flexing of the drawbar and trailer shaft will cause intermittent pushes and pulls or surges on the tow car, which after some time is sufficient to cause much discomfort and oftentimes sickness to the occupants of the tow car and perhaps the occupants of the trailer, especially when the weight of the trailer might be near to or less than that of the tow car.

One of the objects of my invention is to eliminate all or substantially all of the surge referred to above, and to greatly increase the riding comfort to the occupants of the tow car or the occupants of the trailer or both.

A further object is to increase the safety of trailer towing by providing a trailer hitch that will automatically become disconnected when either the tow car or the trailer is turned over on its side, and especially when the trailer is turned over on its side, as the tow car can then pull free of the trailer.

Another object is to eliminate all or substantially all side sway when towing a trailer, and remove the trailer weight from the springs as well as from the bumper of the tow car.

A still further object is to provide a more positive, efficient and at the same time more comfortable hitch between a tow car and trailer.

Another object is to provide a trailer hitch which will permit the operator of the tow car to turn the trailer in as small a space as the car alone could be turned in, and which hitch may be conveniently and comfortably connected up to the tow car, and can be inexpensively and economically manufactured and sold.

Due to the radical improvements in my new trailer hitch over those heretofore known, many other objects, advantages and capabilities inherent in my invention will later become more readily apparent.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Fig. 6 is a diagrammatic side elevation of the drawbar and trailer shaft and the connecting parts thereof when in horizontal position before being flexed or jack-knifed.

Fig. 7 is a diagrammatic side elevation of the parts shown in Fig. 6 after being flexed or jack-knifed, and showing their overall horizontal length as being still the same as in Fig. 6.

Fig. 8 is a side elevation of another form of my improved trailer hitch with the parts in normal position before the flexing or jack-knifing movement takes place.

Fig. 9 is a view similar to Fig. 8 but showing the parts in flexed or jack-knifed position.

Fig. 10 is an enlarged fragmentary side elevation detail, partly in section, of the compensating parts used in the form of my invention shown in Figs. 8 and 9.

Figure 1:
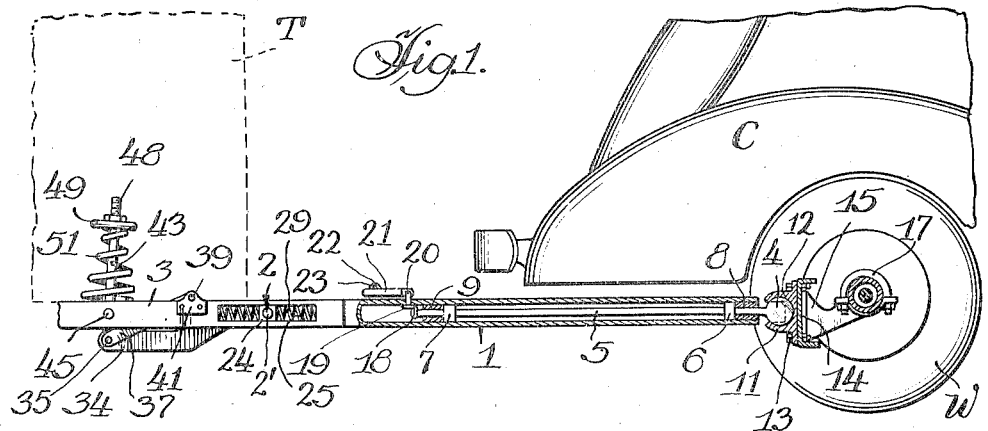
Fig. 1 is a side elevation, partly in longitudinal section, of a trailer hitch embodying my invention, the rear end of the tow car being shown fragmentarily and a fragmentary part of the front end of the trailer being shown in dotted lines.
Figure 2:
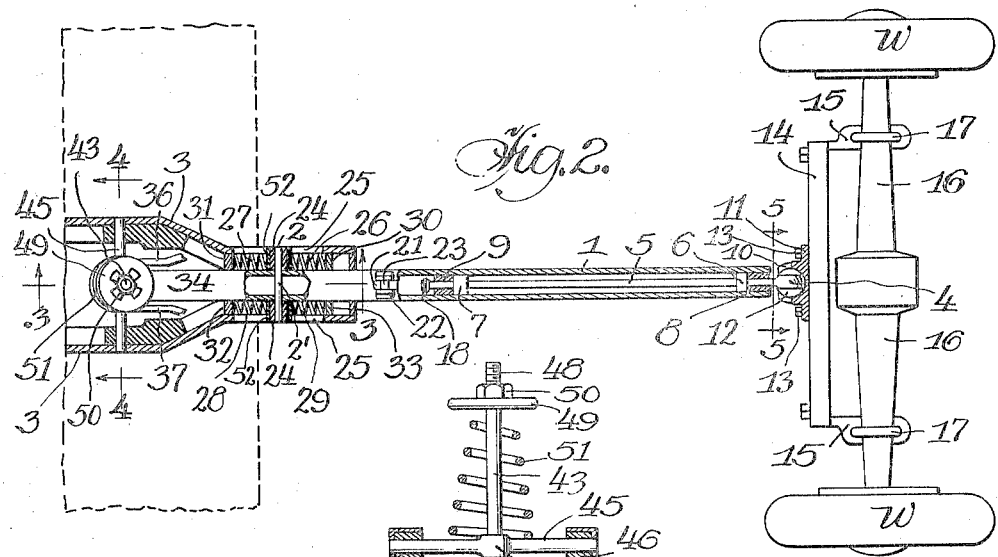
Fig. 2 is a plan view, partly in section on a horizontal plane, of the trailer hitch of Fig. 1, showing only the rear wheels and axle housing with the body of the tow car omitted, and showing the front of the trailer fragmentarily in dotted lines.

Referring in detail to the drawings, my improved hitch comprises in general a drawbar 1, hingedly connected at 2 to a trailer shaft consisting of a pair of trailer frame members 3 securely fixed to the trailer running gear and body. Drawbar 1 has rotatably mounted at its forward end a hitch head 4 carried on the forward end of a rod 5 mounted longitudinally within the drawbar 1 for rotation about its longitudinal axis within the drawbar. Rod 5 has fixed or formed thereon at suitable points collars 6 and 7 which abut against sleeves 8 and 9 to provide the necessary thrust to the drawbar 1, sleeves 8 and 9 being fixed to the drawbar. As shown in Figs. 1 and 2, the rod 5 passes through the sleeves 8 and 9 and is rotatable therein.

The hitch head 4 is of spherical shape except that two of its side faces are cut away and flattened so that the remaining thickness of the head is such that it will readily pass through the slot 10 formed in the bracket 11, which bracket on its interior is formed with a spherical opening 12 to rotatively receive the hitch head 4. As is obvious from the drawings the hitch head, when turned parallel with the slot 10, may be inserted therethrough to bring the spherical head (with its flattened sides) within the spherical opening 12, and when the rod 5 is turned through ninety degrees the hitch head is turned a corresponding amount to stand at right angles to slot 10 and form a detachable hitch connection therewith to connect the trailer to the tow car.

Bracket 11 is secured by any suitable number of bolts or the like 13 to the crossbar 14, which may be made of channel beam or other construction as desired. Crossbar 14 at or near each end is secured to an angle bracket 15, each of which is rigidly fixed to the axle housing 16 by means of U-bolts 17 or other suitable fastening means. This places the pull of the trailer positively and directly on a fixed part of the car (the axle housing) and not on a movable or yieldable part such as the springs, a bumper or the like.

The rear end of rod 5 is formed with a miter gear 18, with which meshingly engages a corresponding miter gear 19 fixed on the lower end of a short shaft 20, to the upper end of which is hingedly connected a handle 21 for rotating shaft 20 for in turn rotating gear 18, shaft 5 and hitch head 4 the desired amount for effecting the hitch in the manner referred to above, or disconnecting it, as desired. For security purposes the free end of handle 21 may be moved downwardly into the space between lugs 22 and held there by a removable pin 23.

For convenience the rear end portion of drawbar 1 is shown as being bent slightly downward (see Fig. 3) to more clearly illustrate the relationship between it and the parts associated therewith. As stated earlier, the drawbar is hingedly connected at 2 to the trailer shaft members 3. This is effected by a pin 2' fixed in the drawbar to extend a distance on both sides thereof. Blocks 24 are mounted one on each of the projecting ends of pin 2', which blocks are slidably mounted in longitudinal slots 25 formed in the forward ends of trailer shaft members 3. Mounted just to the inside of slots 25 and parallel therewith are four coil springs 26, 27, 28 and 29, which when blocks 24 are in mid-position of slots 25 are under equal tension and held in their proper place at their outer ends by plates or lugs 30, 31, 32 and 33, which are fixed to the adjacent trailer shaft member 3, these coil springs abutting at their opposite or inner ends against the blocks 24.

This construction, as will be understood, permits a limited amount of relative longitudinal movement between drawbar 1 and trailer shaft members 3, the coil springs automatically returning blocks 24 to mid-position of slots 25 when drawbar 1 and trailer shaft members 3 are returned to their normal position as shown in Fig. 1.

Figures 3, 4, 5:
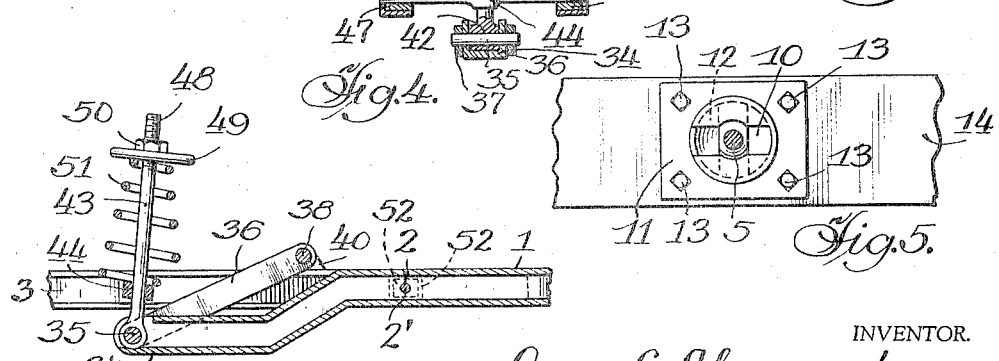
Fig. 3 is a fragmentary, vertical, longitudinal, sectional, detail view of a portion of my trailer hitch.
Fig. 4 is a fragmentary, vertical, transverse, sectional, detail view through the vertical coil spring portion of my hitch.
Fig. 5 is a vertical, transverse section on the line 5—5 of Fig. 2.

The free end 34 of drawbar 1 is provided with a pin 35 extending laterally therethrough and projecting sufficiently at each end to receive the lower ends of links 36 and 37, respectively, as seen in Figs. 3 and 4. The upper end of each of links 36 and 37 are pivotally connected by means of short shafts 38 and 39, either directly to the trailer shaft members 3, respectively, or to a bracket 40 and 41 or other projection fixed to or extending from these trailer shaft members. Also pivotally mounted on pin 35 in the free end 34 of draw bar 1 is the lower end 42 of an upwardly extending rod 43 (see Figs. 3 and 4). Rod 43 extends through the apertured hub or middle portion 44 of a laterally extending pin or shaft 45 mounted at its opposite ends in any suitable bearings 46 and 47 carried by the trailer shaft members 3, so as to be capable of a limited amount of rotational movement therein. The upper end of rod 43 is formed with screw threads 48, upon which threads is threadably mounted adjusting handle 49, which when rotated to the desired position of adjustment is held therein by the adjusting nut 50. Surrounding rod 43 is a coil spring 51, which at its lower end abuts transverse rod 45 and at its upper end abuts the lower face of adjusting wheel 49, this spring being under the desired amount of compression. Rod 43 is vertically slidable through a hole in hub 44 of transverse rod 45. As is obvious, when rod 43 is moved downwardly through the hole in hub 44 coil spring 51 will be compressed, and when the force tending to move rod 43 downwardly is removed this compression in spring 51 will return the parts to normal position shown in Fig. 1. As will be understood, the amount of compression in spring 51 can be varied by adjusting the same with the adjusting wheel 49, so that the said compression can be made greater or less as desired for different loads.

The shaft or crossbar 45, due to its being rotatably mounted at its ends in the trailer shaft members 3, can rotate any amount required to accommodate the change in angularity of the upright rod 43 as drawbar 1 and trailer shaft members 3 and associated parts are moving from the position shown in Fig. 6 to that (or other jackknifed position) shown in Fig. 7, so that the opening in hub 44 of shaft or crossbar 45 will always be in alinement with upright rod 43 and free from cramping strain.

As will be seen in Fig. 2 and as described above, the hitch head 4 is connected to the tow car substantially as close to the axle housings as can be. The point of attachment to the tow car is thus so close to the axle of the car that side sway is eliminated.

The construction and arrangement of parts described above is such as to eliminate surge between the trailer and the tow car. To make the reason for this elimination of surge more easily understood I have shown diagrammatically in Fig. 6 the drawbar 1, the trailer shaft members 3 and associated parts when the drawbar and trailer shaft members are in their normal or substantially alined position, and in Fig. 7 I have shown these parts jack-knifed or positioned at an angle to each other as occurs immediately following the encountering by the rear wheels of a tow car, of a depression or a hump in the road.

Assuming for illustration that one or both of the rear wheels of the tow car drop into a depression in the road, the front end of the drawbar 1 will be correspondingly carried downward by the rear axle housing of the tow car, and immediately upon the rear wheel or wheels of the tow car again coming up out of said depression the weight of the front end of the trailer will cause a downward thrust at the forward end of the trailer shaft members 3, which will cause the joint or hinged point 2 of Figs. 1, 2 and 3 to move downwardly to a lowered position, which for illustration will be assumed to be that shown diagrammatically in Fig. 7. If the depression is a deep one, the parts may assume a position at a greater angle than shown in Fig. 7, or if the depression is of less depth the angularity between drawbar 1 and trailer shaft members 3 may be less than that shown in Fig. 7. It is accordingly to be understood that Fig. 7 merely illustrates one of the many positions these parts might assume depending upon the depth of the depression.

The downward thrust at hinged joint 2 will accordingly move the parts from the position shown in Fig. 6 to the position shown in Fig. 7. Were the parts merely hinged with a simple hinge, it will be readily understood that the distance between the rear axle of the tow car and the axle of the trailer would become shortened. This shortening, however, is in my invention compensated in a manner which will now be described.

As links 36 and 37 are positively pivotally connected at their lower ends to the free end of drawbar 1 and at their upper ends to trailer shaft members 3, it will be seen that as the free end of drawbar 1 moves downwardly from the position shown in Fig. 6 to the position shown in Fig. 7, links 36 and 37 will swing to the left or rear about a circle having a center around pin 35 and a radius equal to the length of links 36 and 37. This will cause the upper end of links 36 and 37 to move a distance rearwardly, which will force trailer shaft members 3 to move a corresponding distance rearwardly, this being permitted by slots 25 moving rearwardly with relation to blocks 24 and with a corresponding greater compression in coil springs 26 and 29 and a corresponding lessening in compression of springs 27 and 28. The parts are so constructed and arranged that the amount of rearward movement in trailer shaft members 3 by links 36 and 37 produces an elongation in the jack-knifing parts as a whole equal to the shortening that would have otherwise occurred by reason of the jack-knifing. In other words, the amount of shortening to the jack-knifing movement is offset by the lengthening produced by the compensating links 36 and 37, whereby the effect is to prevent any shortening or lengthening of the trailer hitch and thus eliminate the uncomfortable sensation to the occupants of the tow car which would otherwise have been suffered from such surge.

While I do not wish to be unduly limited thereto, as any arrangement and proportion of parts that will produce this result are comprehended within the spirit of my invention, one arrangement of parts that will give this result is produced by the proportion $X = \frac{1}{3}Y$ where X is the horizontal distance between the center of the pivot at the upper end of the compensating links 36 and 37 and a vertical line passing through the center of the hinge pin 2' of the hinge 2 (when the parts are in the position shown in Fig. 6), and Y equals X plus the length between the pivotal centers of either one of the compensating links 36 and 37. This is the proportion of parts used in the illustration in Figs. 6 and 7. To compensate for any slight inaccuracies that may occur in forming and assembling of parts, I preferably provide an outer rubber casing 52 for each of the blocks 24 to permit a limited amount of lateral movement of blocks 24 in slots 25, and also for preventing any chattering or rattling between these parts. As will be understood from Fig. 3, when the parts are moved from the position shown in Fig. 6 to that shown in Fig. 7, coil spring 51 will be placed under more compression so that as soon as the downward thrust on joint 2 caused by the inertia of the front end of the trailer is relieved, the compression in coil spring 51 will return the parts to their normal position shown in Fig. 6.

The structure and arrangement of parts described above is preferable when my improved hitch is to be built into the trailer when the latter is constructed. When the hitch is to be provided for a trailer that is already built, the form shown in Figs. 8 and 9 is used, which will now be described.

In Fig. 8, the construction of the front end of the drawbar and its connecting parts for connecting the drawbar to the tow car rear axle housing is substantially the same as that described in connection with Figs. 1 and 2 and will not be here repeated. As will be obvious, various changes may be made in this construction without departing from the spirit of my invention.

The rear end of the drawbar 1' is fixed to a rearwardly projecting extension 53 by U-bolts 54 or other suitable securing means, extension 53 being of Y-shape with an upper surface wide enough to accommodate the compensating member 55 hereinafter described. Extending rearwardly from the rear end of each of the Y legs of extension 53 is a leaf spring assembly 56, which normally occupies an arched position as shown in Fig. 8, and when the parts are thrown into a jack-knife or angular position will be substantially straightened out as shown in Fig. 9. The leaf spring assemblies 56 (one on each side) are each pivotally connected at 57 to a link 58 which at its upper end 59 is pivotally connected to the underside of the trailer shaft members 60. A stop member 61 is rigidly mounted to the lower face of the trailer shaft member or members 60, against which stop the lower end of link 58 contacts at all times to prevent any undesirable backward swinging movement of the lower end of link 58, and to cause any lengthening movement due to straightening of the leaf spring assemblies to be in a direction away from the stop.

The trailer shaft member or members 60, of which any number desired may be used for supporting the trailer body, will extend rearwardly to the axle of the trailer and further if desired (not shown), and forwardly in the form of a neck 62, having formed on or secured to its front end a socket member 63 adapted to receive a ball 64 to form a ball and socket joint. Extending downwardly from ball 64 is a threaded stem 65 adapted to be screwed into a corresponding threaded opening in the pedestal 66, the lock nut 67 locking the parts in any position desired. This rigidly connects the ball 64 to pedestal 66 to move therewith in accordance with the pull or push on ball 64 by neck 62 of the trailer shaft member or members 60. Pedestal 66 during such pull or push by neck 62 is given a rocking movement by virtue of it being pivotally connected to a pin or pins 68 passing through a pair of ears 69, one on each side of member 53. Pedestal 66 has a forward extending web 70 and a rearwardly extending web 71, which webs are each provided with a flange 72 and 73, respectively. The upper face of member 53 is provided with a depression 74 within which depression is seated a pair of rubber blocks 75 and 76, which blocks when the pedestal 66 is in normal upright position rest upon the upper surface of depression 74 and at their upper faces have contact with the underfaces of the webs 70 and 71 of pedestal 66. An upstanding lug 77 is provided at the forward lower edge of rubber block 75 to prevent the same from moving out of proper position. A similar lug 78 is provided at the lower rear edge of rubber block 76 to perform a similar function. It will thus be seen that the rubber blocks normally hold the pedestal 66 in an upright vertical position.

In the form of my invention shown in Figs. 8, 9 and 10, the operation is similar to that of the form shown in Figs. 1 to 7, inclusive. In the operation of the form shown in Figs. 8, 9 and 10, when one or both of the rear wheels W of the tow car drops into a depression the forward end of the drawbar 1' will be correspondingly lowered, together with a proportional angular lowering of all the parts back to the axis of the trailer wheels. When the rear wheel or wheels W of the tow car move upwardly again out of the depression, the inertia in a downward direction imparted by the trailer to ball 64 will press downwardly through pedestal 66, imparting a downward movement to member 53 (which, as described above, is fixed to the rear end of drawbar 1'), and thus bend the leaf spring assembly 56 from its arched position shown in Fig. 8 to its straightened out position shown in Fig. 9. This brings the parts into the jack-knife position shown in Fig. 9, which without proper compensation would shorten the distance between the rear axle of the tow car and the axle of the trailer for reasons that will be understood in connection with the description of the operation of Figs. 1 to 7. I have compensated for this shortening effect in the form shown in Figs. 8, 9 and 10 by the lengthening effect caused by the straightening of the leaf spring assembly 56 as shown in Fig. 9, and the rocking of the ball pedestal. During this jack-knife movement pedestal 66 will be moved from its normal upright position to a tilted position shown in Fig. 9, which tilting is compensated for by the rubber blocks 75 or 76, depending upon the direction of tilt of pedestal 66. As shown in Fig. 9, this tilt is to the rearward.

The construction and operation just described in connection with Figs. 8, 9 and 10 is such as to accomplish the same result as accomplished by the form shown in Figs. 1 to 7, inclusive, in that it compensates for any shortening effect which would otherwise be caused by the jack-knifing movement between the drawbar and the trailer shaft member or members, and thus prevents any shortening or lengthening between the tow car and the trailer and correspondingly eliminates the undesirable surge therebetween.

The similarity in operation between the forms shown in Figs. 8, 9 and 10 and that of the form shown in Figs. 1 to 7 will be better understood when it is kept in mind that the hinge pin 68 performs the same general function in Figs. 8 to 10 as the hinge pin 2' in Figs. 1 to 7, while rubber blocks 75, 76 of Figs. 8 to 10 correspond to the coil springs 26, 27, 28 and 29 of Fig. 2, and the straightening of the leaf spring assembly 56 in Figs. 8 to 10 correspond generally in operation to the links or shackles 36 and 37 of Figs. 1 to 7.

As will be understood, the rear end portion of the tow car in Figs. 1 and 8 is indicated generally at C, the rear wheels of the tow car being indicated at W while the front end of the trailer has been generally designated at T.

The links or shackles 58 will be provided with rubber cushions around the pivot pins at the two ends to give long wear and silence in operation. Also in Figs. 8 to 10 the length of drawbar 1' can be increased or decreased by loosening the nuts on the U-bolts, changing the length, and again tightening these nuts. The connections with the rear axle housing of the tow car in Figs. 8 and 9 may be axle brackets to fit a Ford car if a Ford car is used for towing; or they may be of any construction desired to accommodate the particular kind of tow car.

In Figs. 6 and 7 the axis of the rear wheels of the tow car is shown at e, while the axis of the trailer wheels is shown at f.

Having now described my invention, I claim:

1. In a trailer hitch, a drawbar having one end adapted to be secured to a tow vehicle, trailer shaft means adapted to support a trailer, said drawbar and trailer shaft means being pivotally connected together for jack-knifing movement, and means controlling said movement so constructed and arranged that the overall length of said drawbar and trailer shaft means will remain substantially the same during said movement.

2. In a trailer hitch, a drawbar adapted to be detachably secured at one end to a towing vehicle, trailer shaft means adapted to carry a trailer body, said drawbar and said trailer shaft means being pivotally connected together to permit a jack-knife movement therebetween, and compensating means for causing the general overall length of said drawbar and trailer shaft means to remain substantially the same during said jack-knife movement.

3. In a trailer hitch, a drawbar adapted to be detachably secured at one end to a towing vehicle, trailer shaft means adapted to carry a trailer body, said drawbar and said trailer shaft means being pivotally connected together to permit a jack-knife movement therebetween, and compensating means for causing the general overall length of said drawbar and trailer shaft means to remain substantially the same during said jack-knife movement, said compensating means comprising yieldable elements enabling relative longitudinal movement between the drawbar and trailer shaft means during the jack-knife movement.

4. In a trailer hitch, a drawbar adapted to be detachably secured at one end to a towing vehicle, trailer shaft means adapted to carry a trailer body, said drawbar and said trailer shaft means being pivotally connected together to permit a jack-knife movement therebetween, compensating means for causing the general overall length of said drawbar and trailer shaft means to remain substantially the same during said jack-knife movement, said compensating means comprising yieldable elements enabling relative longitudinal movement between the drawbar and trailer shaft means during the jack-knife movement, and means for positively causing said relative longitudinal movement proportionately to the jack-knife movement so as to keep the distance between the car and trailer substantially constant during the jack-knife movement.

5. In a trailer hitch, a drawbar having means adapted to pivotally secure the front end of the drawbar close to the rear axle of a tow car against side sway, trailer shaft means hingedly connected to the drawbar for a limited amount of movement longitudinally thereof during jack-knife movement therebetween, resilient means for returning said longitudinal movement to normal when the drawbar and trailer shaft are returned to their normal position following the jack-knife movement, and means for positively causing said longitudinal movement during jack-knife movement in proportion to the amount of jack-knife movement so as to keep the car and trailer a substantially constant distance apart at all times.

6. In a trailer hitch, a drawbar adapted to be attached close to the rear axle of a tow car, trailer shaft means adapted to support a trailer, means connecting the drawbar and trailer shaft means together to enable a jack-knife movement therebetween when the tow car passes over a depression or hump in the roadway, resilient means tending to resist said jack-knife movement but permit a limited amount thereof, and means for increasing the overall length of the combined drawbar and trailer shaft means by an amount substantially equal to the amount said overall length is lessened by the jack-knife movement so as to maintain the distance between the tow car and trailer substantially constant at all times.

7. In a trailer hitch, a drawbar adapted to be pivotally attached to a tow car, trailer shaft means adapted to carry a trailer, said drawbar and said trailer shaft means being hingedly connected together, means enabling a relative longitudinal movement between the drawbar and trailer shaft means during jack-knife movement therebetween, a link pivotally connected to each of the drawbar and trailer shaft means and so arranged as to cause a relative lengthening movement between the drawbar and trailer shaft means during the opening part of the jack-knife movement by an amount equal to the overall shortening of these parts by the jack-knife movement so as to maintain the distance between the tow car and trailer substantially constant at all times.

8. In a trailer hitch, a drawbar adapted to be pivotally attached to a tow car, trailer shaft means adapted to carry a trailer, said drawbar and said trailer shaft means being hingedly connected together, means enabling a relative longitudinal movement between the drawbar and trailer shaft means during jack-knife movement therebetween, a link pivotally connected to each of the drawbar and trailer shaft means and so arranged as to cause a relative lengthening movement between the drawbar and trailer shaft means during the opening part of the jack-knife movement by an amount equal to the overall shortening of these parts by the jack-knife movement so as to maintain the distance between the tow car and trailer substantially constant at all times, and resilient means to return the drawbar and trailer shaft means to their normal position from their jack-knifed position.

9. In a trailer hitch, a drawbar adapted to be pivotally attached to a tow car, trailer shaft means adapted to carry a trailer, said drawbar and said trailer shaft means being hingedly connected together, means enabling a relative longitudinal movement between the drawbar and a trailer shaft means during jack-knife movement therebetween, a link pivotally connected to each of the drawbar and trailer shaft means and so arranged as to cause a relative lengthening movement between the drawbar and trailer shaft means during the opening part of the jack-knife movement by an amount equal to the overall shortening of these parts by the jack-knife movement so as to maintain the distance between the tow car and trailer substantially constant at all times, resilient means to return the drawbar and trailer shaft means to their normal position from their jack-knifed position, and means for adjusting the tension of said resilient means.

10. In a trailer hitch, a drawbar, trailer shaft means adapted to be secured to a trailer, said trailer shaft means and said drawbar being hingedly connected together so as to have limited jack-knife movement, one of said drawbar and trailer shaft means having an extending slot and the other a projecting pin slidable in said slot to permit relative longitudinal movement between said parts during jack-knife movement, a coil spring on each side of said projecting pin in said slot to return the ends of said slot to normal position with relation to said pin after said jack-knife movement, and a link pivotally connected at its opposite ends to the drawbar and trailer shaft means respectively to positively move one of said parts with relation to the other during jack-knife movement an amount to substantially compensate for the shortening effect due to the jack-knife movement.

11. In a trailer hitch, a drawbar having at its forward end a ball adapted to detachably fit into a socket at the rear of a tow car, trailer shaft means adapted to be secured to a trailer, said trailer shaft means and said drawbar being hingedly connected together so as to have limited jack-knife movement, one of said drawbar and trailer shaft means having an extending slot and the other a projecting pin slidable in said slot to permit relative longitudinal movement between said parts during jack-knife movement, a coil spring on each side of said projecting pin in said slot to return the ends of said slot to normal position with relation to said pin after said jack-knife movement, and a link pivotally connected at its opposite ends to the drawbar and trailer shaft means respectively to positively move one of said parts with relation to the other during jack-knife movement an amount to substantially compensate for the shortening effect due to the jack-knife movement.

12. In a trailer hitch, a drawbar adapted to be attached at one end to a tow car, trailer shaft means hingedly connected to said drawbar, one of the drawbar and trailer shaft means having a longitudinal slot, and the other a projection slidable longitudinally in said slot, coil springs in said slot one on each side of the projection and bearing thereagainst and against abutments fixed with relation to the slot, the drawbar extending a distance rearwardly of the slot, a link pivotally connected at its opposite ends to the rear end portion of the drawbar and the trailer shaft means respectively to positively move one of said parts longitudinally with relation to the other during jack-knife movement an amount to substantially compensate for the shortening effect due to the jack-knife movement, a rod pivotally connected to the rear end portion of the drawbar and swingably connected to the trailer shaft means, and a coil spring surrounding said rod to be compressed during the first half of the jack-knife movement and return the parts to normal position when the force causing the jack-knife movement is released.

13. In a trailer hitch, a drawbar adapted to be attached at one end to a tow car, trailer shaft means hingedly connected to said drawbar, one of the drawbar and trailer shaft means having a longitudinal slot, and the other a projection slidable longitudinally in said slot, coil springs in said slot one on each side of the projection and bearing thereagainst and against abutments fixed with relation to the slot, the drawbar extending a distance rearwardly of the slot, a link pivotally connected at its opposite ends to the rear end portion of the drawbar and the trailer shaft means respectively to positively move one of said parts longitudinally with relation to the other during jack-knife movement an amount to substantially compensate for the shortening effect due to the jack-knife movement, a rod pivotally connected to the rear end portion of the drawbar and swingably connected to the trailer shaft means, a coil spring surrounding said rod to be compressed during the first half of the jack-knife movement and return the parts to normal position when the force causing the jack-knife movement is released, and means to vary at will the amount of compression in the last mentioned coil spring.

14. In a trailer hitch a drawbar, trailer shaft means swingably connected to the drawbar and capable of jack-knife movement therewith, means enabling the drawbar and trailer shaft means to have limited longitudinal movement with relation to each other, link means pivotally connected to each of the drawbar and trailer shaft means to cause them to have relatively longitudinal movement during jack-knife movement, and resilient means between the drawbar and trailer shaft means to return these parts to normal position upon release of the force causing the jack-knife movement.

15. In a trailer hitch, a drawbar adapted to be detachably attached at its front end to the rear of a tow car, a leaf spring assembly secured to the rear end of the drawbar and having a substantial upstanding arch formation, trailer shaft means swingably connected to the drawbar, a link pivotally connected at its ends to the lower free end of the leaf spring assembly and the trailer shaft means respectively, and resilient means in the swingable connection between the drawbar and the trailer shaft means to permit relative longitudinal movement therebetween.

16. In a trailer hitch, a drawbar adapted to be detachably attached at its front end to the rear of a tow car, a leaf spring assembly secured to the rear end of the drawbar and having a substantial upstanding arch formation, trailer shaft means swingably connected to the drawbar, a link pivotally connected at its ends to the lower free end of the leaf spring assembly and the trailer shaft means respectively, resilient means in the swingable connection between the drawbar and the trailer shaft means to permit relative longitudinal movement therebetween, and a stop fixed to the trailer shaft means against which stop the lower end of said link is adapted to abut.

17. In a trailer hitch, a drawbar, trailer shaft means swingably connected thereto, a leaf spring assembly fixed to the drawbar and swingably connected with the trailer shaft means, and resilient means in the swingable connection between the drawbar and the trailer shaft means to permit a limited amount of relative longitudinal movement therebetween.

18. In a trailer hitch, a drawbar, trailer shaft means swingably connected thereto, a leaf spring assembly fixed to the drawbar and swingably connected with the trailer shaft means, resilient means in the swingable connection between the drawbar and the trailer shaft means to permit a limited amount of relative longitudinal movement therebetween, said resilient means comprising rubber blocks, and a tiltable pedestal normally held in upright position by said blocks but yieldingly permitted by said blocks to tilt forward and backward.

OSCAR G. ALMCRANTZ.